United States Patent
Nambiar et al.

(10) Patent No.: US 11,194,350 B2
(45) Date of Patent: Dec. 7, 2021

(54) NAVIGATION OF AN AUTONOMOUS VEHICLE FOR FOLLOWING INDIVIDUALS

(71) Applicant: International Business Machines Corporation, Armonk, NY (US)

(72) Inventors: Manesh C. Nambiar, Pune (IN); Rashmi Khanna, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 389 days.

(21) Appl. No.: 16/162,904

(22) Filed: Oct. 17, 2018

(65) Prior Publication Data

US 2020/0125121 A1  Apr. 23, 2020

(51) Int. Cl.
G05D 1/12 (2006.01)
B60W 30/165 (2020.01)
G05D 1/00 (2006.01)
G06K 9/00 (2006.01)
G06N 20/00 (2019.01)

(52) U.S. Cl.
CPC .............. *G05D 1/12* (2013.01); *B60W 30/165* (2013.01); *G05D 1/0088* (2013.01); *G06K 9/00355* (2013.01); *G06N 20/00* (2019.01); *G05D 2201/0213* (2013.01)

(58) Field of Classification Search
USPC ............................................................ 701/23
See application file for complete search history.

(56) References Cited

U.S. PATENT DOCUMENTS

| | | | |
|---|---|---|---|
| 6,400,042 B1 * | 6/2002 | Winner, Jr. ........... | B60R 25/045 307/10.5 |
| 8,457,827 B1 | 6/2013 | Ferguson et al. | |
| 9,196,164 B1 | 11/2015 | Urmson et al. | |
| 9,481,366 B1 | 11/2016 | Gordon et al. | |
| 9,513,629 B1 * | 12/2016 | Thorn ...................... | G05D 1/12 |
| 9,643,722 B1 * | 5/2017 | Myslinski .............. | B64D 47/02 |
| 9,778,653 B1 * | 10/2017 | McClintock ............ | B60L 53/65 |
| 2006/0229793 A1 * | 10/2006 | Sawamoto ................ | B60T 7/22 701/96 |
| 2014/0309836 A1 | 10/2014 | Ollis | |
| 2017/0108878 A1 * | 4/2017 | Krispin .................. | G08B 5/002 |
| 2017/0168503 A1 | 6/2017 | Amla et al. | |
| 2017/0361841 A1 * | 12/2017 | Kojo ................. | B60W 30/0956 |
| 2018/0157268 A1 * | 6/2018 | Mangai ..................... | G06F 3/017 |
| 2019/0072985 A1 * | 3/2019 | Taveira .................. | G08G 1/164 |
| 2019/0225220 A1 * | 7/2019 | Laine ..................... | G08G 1/167 |
| 2019/0265734 A1 * | 8/2019 | Liu ........................ | G05D 1/106 |

* cited by examiner

*Primary Examiner* — Krishnan Ramesh
(74) *Attorney, Agent, or Firm* — Konrad Raynes Davda & Victor LLP; Rabindranath Dutta

(57) ABSTRACT

A sensor of a vehicle receives an identification of a device coupled to an individual via a wireless communications protocol established between the device and the sensor. A computational device on the vehicle processes the identification to uniquely identify the individual. The computational device controls movements of the vehicle to maintain a computed distance at which the vehicle follows the individual.

20 Claims, 11 Drawing Sheets

NAVIGATION OF AN AUTONOMOUS VEHICLE FOR FOLLOWING INDIVIDUALS

BACKGROUND

1. Field

Embodiments relate to the navigation of an autonomous vehicle for following individuals.

2. Background

An autonomous vehicle (also known as a self-driving vehicle or a driverless car) is a vehicle that is capable of sensing its environment and navigating either completely by itself or without much human intervention. Autonomous vehicles combine a variety of mechanisms to perceive their surroundings by using sensors such as video cameras, radar units, laser units, Geographical Positioning System (GPS) units, etc. A controller may interpret the sensory information acquired by the sensors to identify appropriate navigation paths for the autonomous vehicle.

SUMMARY OF THE PREFERRED EMBODIMENTS

Provided are a method, system, and computer program product in which a sensor of a vehicle receives an identification of a device coupled to an individual via a wireless communications protocol established between the device and the sensor. A computational device on the vehicle processes the identification to uniquely identify the individual. The computational device controls movements of the vehicle to maintain a computed distance at which the vehicle follows the individual.

In additional embodiments, the wireless communication comprises radio frequency communication, wherein the computed distance is based on triangulation that determines a position of the individual and also based on a speed of movement of the individual.

In yet additional embodiments, individuals other than the identified individual are prevented from taking control of the vehicle.

In certain embodiments, the sensor receives an image of a hand gesture of the individual. A determination is made of an action to perform on the vehicle, based on interpreting the image of the hand gesture.

In certain embodiments, the hand gesture is an indication for the vehicle to stop, wherein the vehicle is sent a command to stop in response to the interpreting of the hand gesture.

In further embodiments, the computational device uses a learning module to predict anticipated turns of the individual.

In additional embodiments, in response to determining that there is an obstacle that does not allow following of the individual, the computational device stops the vehicle and communicates to the individual that the vehicle has been stopped.

In certain embodiments, in response to an event that causes the vehicle from not being able to follow the individual, the computational device reroutes the vehicle to position the vehicle at a location that is proximate to the individual for following the individual at a later point in time.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

In many situation, runners or cyclists are followed by a dedicated vehicle on a roadway. The dedicated vehicle may protect the runners or cyclists from being hit by another vehicle. Additionally, in the event the runner or the cyclist desires to stop running or cycling, the dedicated vehicle may be used to transport the runner or cyclist. Such situations may occur in case of inclement weather or because of tiredness on the part the part of cyclist or runner or for other reasons. Furthermore, refreshments and other supplies may be transported in the dedicated vehicle.

Certain embodiments provide mechanisms for an autonomous vehicle to follow a particular person while he or she is walking, running or cycling on a roadway. Such embodiments provide improvements to computer technology and other technology installed in an autonomous vehicle by improvements to the controller and improvements to a decision making component that generates signals for vehicle movement based on data from other components. Additionally, output of sensor components are integrated into such technologies

Exemplary Embodiments

Figure 1:
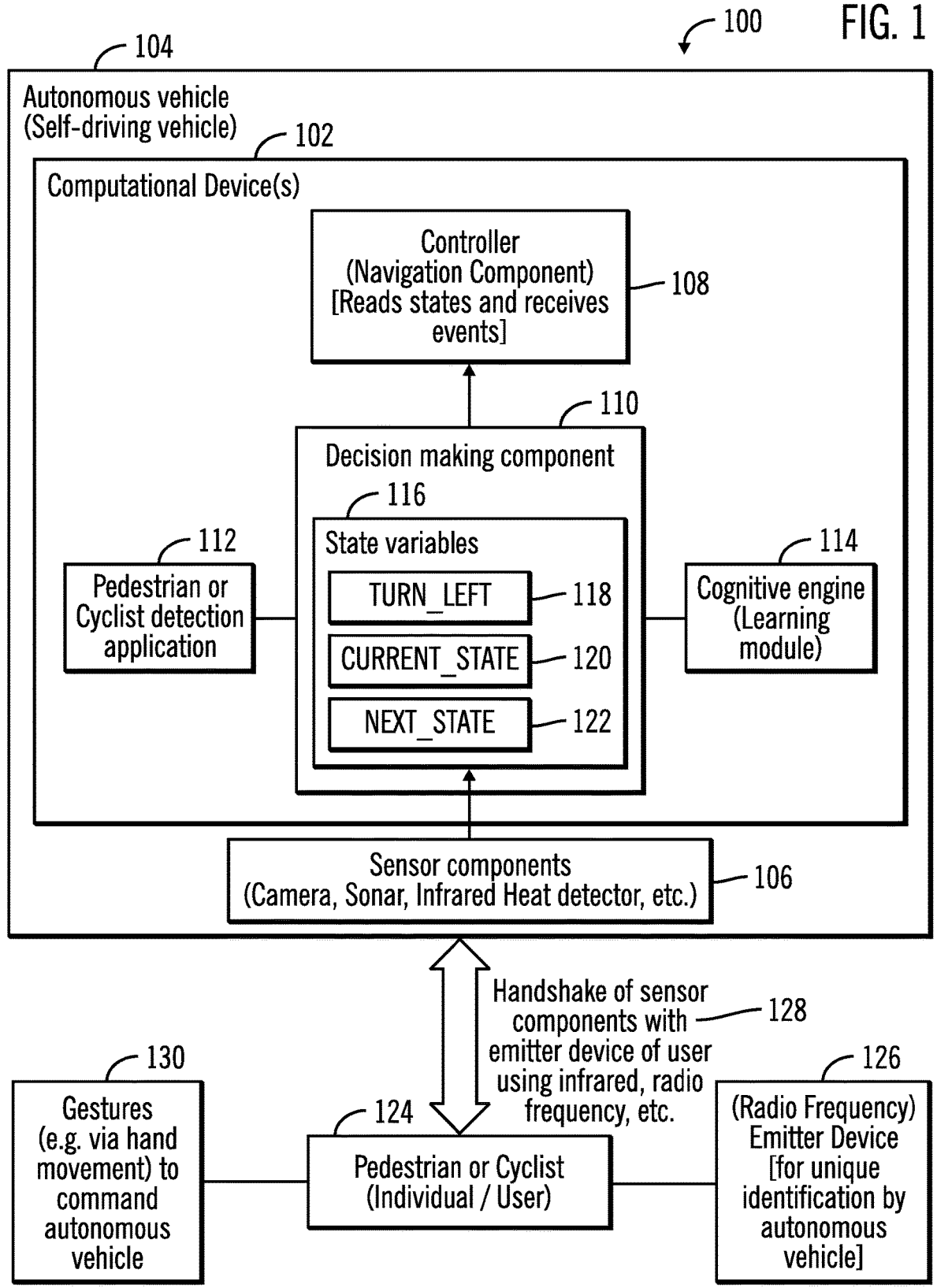
FIG. 1 illustrates a block diagram of a computing environment comprising a computational device deployed in an autonomous vehicle, in accordance with certain embodiments.

FIG. 1 illustrates a block diagram of a computing environment 100 comprising a computational device 102 deployed in an autonomous vehicle 104, in accordance with certain embodiments.

The computational device 102 may comprise any suitable computational device including those presently known in the art, such as, a personal computer, a workstation, a server, a mainframe, a hand held computer, a palm top computer, a telephony device, a network appliance, a blade computer, a processing device, a controller, etc. In certain embodiments, the computational device may be comprised of a plurality of servers. The plurality of servers may provide redundancy because if one server undergoes a failure from which recovery is not possible, an alternate server may perform the functions of the server that failed.

The autonomous vehicle 104 may comprise any suitable vehicle, such as a passenger car, a sports utility vehicle, a van, a bus, a truck, a motorcycle, etc. Sensor components 106 comprising sensors such as camera, sonars, infrared heat detectors, etc., may be embedded in the autonomous vehicle 104.

The computational device 102 may be comprised of or may be coupled to a controller 108 that comprises a navigation component for sending commands to operate the autonomous vehicle 104. In certain embodiments, a decision making component 110 implemented in software, firmware, hardware on any combination thereof, interacts with a pedestrian or cyclist detection application 112 and a cognitive engine (also referred to as a learning module) 114 to set various state variables 116, where the state variables 116 indicate a state of the autonomous vehicle 104. For example, three exemplary state variables referred to as TURN_LEFT, CURRENT_STATE, and NEXT_STATE are shown in FIG. 1 corresponding to a left turn, the current state, and the next state of the autonomous vehicle 104 respectively. The controller 108 is configured to read the state variables 116 set by the decision making component 110.

The computational device 102 controls the autonomous vehicle 104 to follow a pedestrian or cyclist 124 on a roadway or a path. The pedestrian or cyclist 124 may also be referred to as an individual or a user.

In certain embodiments, the individual 124 may hold or wear an emitter device 126, such as a radio frequency emitter device or some other device for unique identification by the sensor components 106 of the autonomous vehicle. A wireless communications protocol may be used to establish an electronic handshake (i.e., a communications session for data exchange) between the emitter device 126 (or some other alternate device) and the sensor components 106. The handshaking may be performed via infrared, radio frequency, etc., depending or the characteristics of the emitter device 126.

In certain embodiments, the individual 124 may also use gestures, such as hand movements, to command the autonomous vehicle 104 to perform certain tasks while the autonomous vehicle 104 is following the individual 124.

In certain embodiments, the computational device 102, the sensor components 106, and the emitter device 126 may be elements in any suitable network, such as, a storage area network, a wide area network, the Internet, an intranet. In certain embodiments, computational device 102, the sensor components 106, and the emitter device 126 may be elements in a cloud computing environment.

Therefore, FIG. 1 describes certain embodiments in which a computational device 102 controls the autonomous vehicle 104 to follow an individual 124 and maintain a safe distance from the individual 124.

Figure 2:
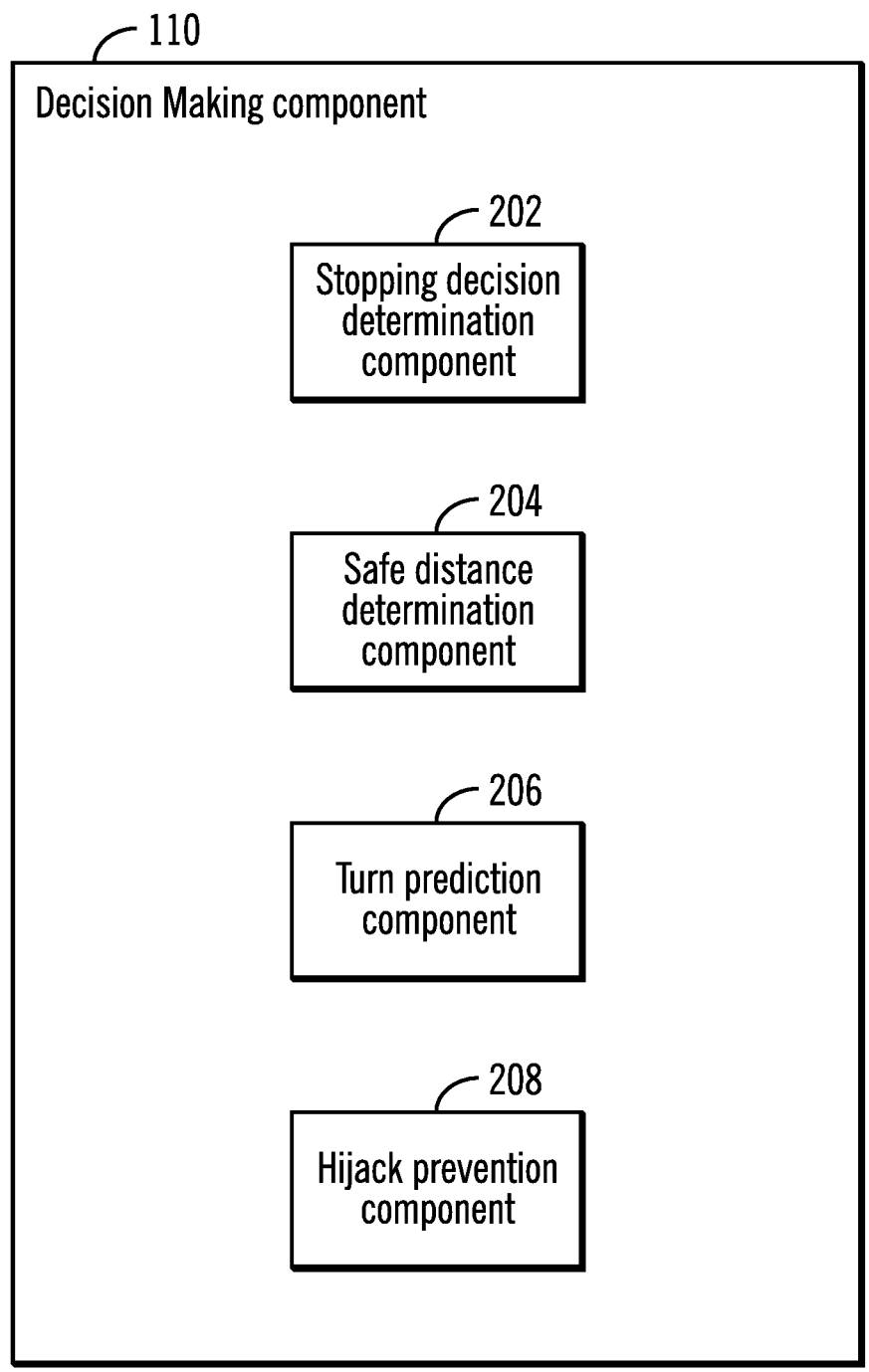
FIG. 2 illustrates a block diagram of a decision making component, in accordance with certain embodiments.

FIG. 2 illustrates a block diagram of the decision making component 110 implemented in the computational device 102, in accordance with certain embodiments. In certain embodiments, the decision making component 110 includes a stopping decision determination component 202, a safe distance determination component 204, a turn prediction component 206 and a hijack prevention component 208.

The stopping decision determination component 202 provides a system for stopping and getting into the vehicle 104. Whenever the individual 124 stops, the vehicle 104 stops behind the individual, and permits the individual 124 to get into the vehicle 104 and take control over the vehicle 104.

The safe distance determination component 204 provides a system for maintaining constant safe distance from the individual 124. The vehicle 104 maintains a safe distance from the individual, so that if the individual 124 suddenly falls or stops while walking, running or cycling, the vehicle 104 is able to stop within a safe braking distance. This safe braking distance may vary depending on the speed of the individual. For example, if the individual is cycling at 15 km/hr. then the vehicle 104 may maintain a distance of 10 meters, whereas if the individual increases his speed to 35 km/hr. then the distance may be increased to 20 meters.

The turn prediction component 206 provides a system to predict a turn to be made by the individual 124. At any intersection or turn on the road, the vehicle 104 is able to predict via cooperation with the cognitive engine 114 that the individual 124 may suddenly turn, and therefore the vehicle 104 slows down at such junctions, and waits to see whether the individual turns or not. Subsequently the vehicle provides turn indications and turns behind the individual.

The hijack prevention component 208 provides a system to prevent hijacking of the vehicle 104. The hijack prevention component 208 prevents a person other than the individual 124 from taking control over the vehicle 104 and hijacking the vehicle 104 while the individual 124 is walking, cycling or running in front of the vehicle 104. For example, such prevention of hijacking may be performed by locking the doors, and making warning sounds or triggering the horn to emit a loud sound, if someone tries to come in front of the vehicle and block the vehicle from following the individual 124. This way the individual 124 is informed of the effort being made for hijacking the vehicle 104.

Figure 3:
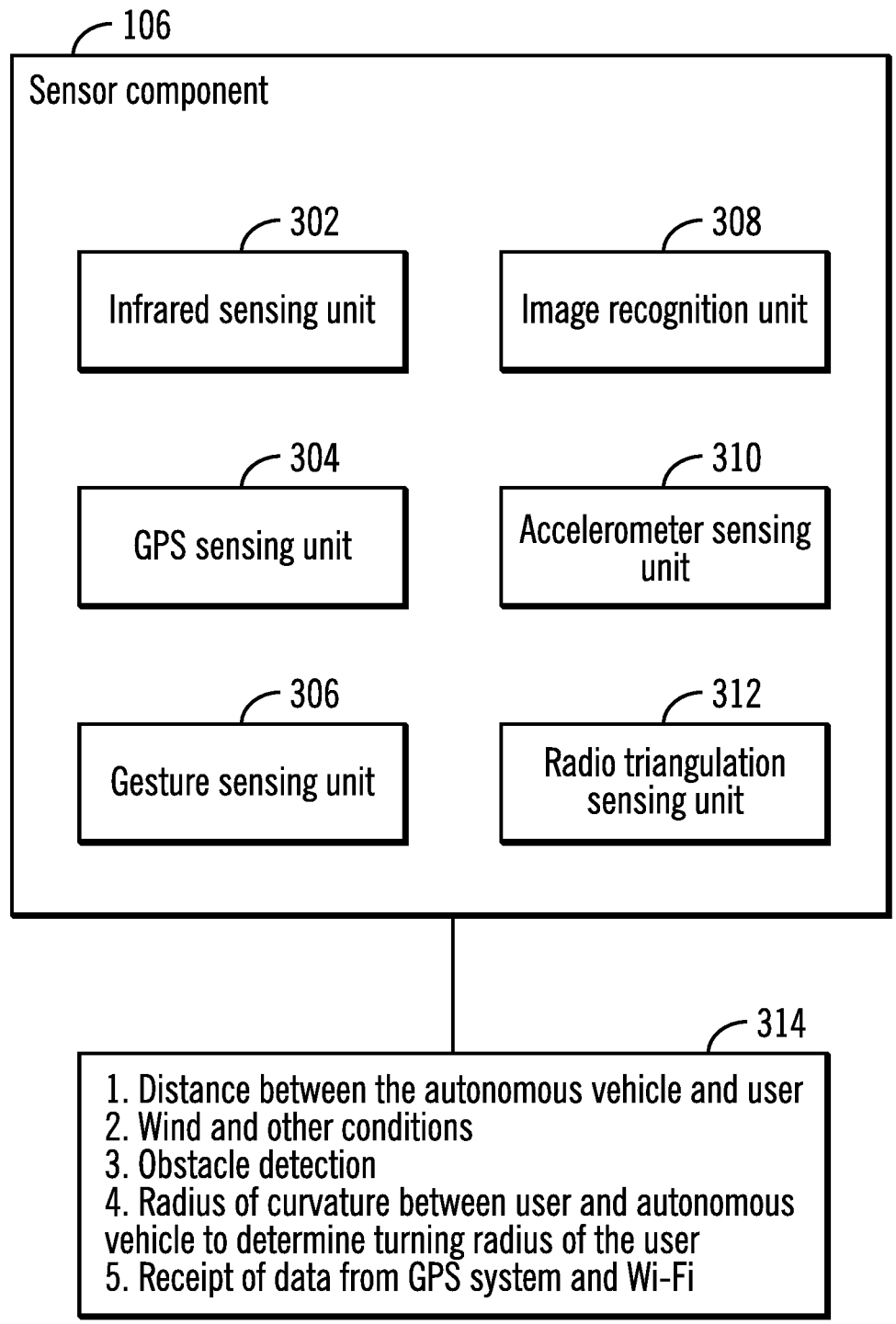
FIG. 3 illustrates a block diagram of a sensor component, in accordance with certain embodiments.

FIG. 3 illustrates a block diagram of a sensor component 106, in accordance with certain embodiments. The sensor component 106 captures various data about user, distance, environment etc., and includes subcomponents such as an infrared sensing unit 302, a global positioning system (GPS) sensing unit 304, a gesture sensing unit 306, an image recognition unit 308, an accelerometer sensing unit 310, and a radio triangulation sensing unit 312.

The sensor components receives inputs from the various sensors 302, 304, 306, 308, 310, 312 in the vehicle to determine:
1. Distance between the vehicle and individual (e.g., via the radio triangulation sensing unit 312);
2. Wind and other conditions;
3. Obstacle detection;
4. Radius of curvature between individual and vehicle to determine turning radius of the individual; and
5. Location data from GPS sensing unit augmented with Wi-Fi.

Figure 4:
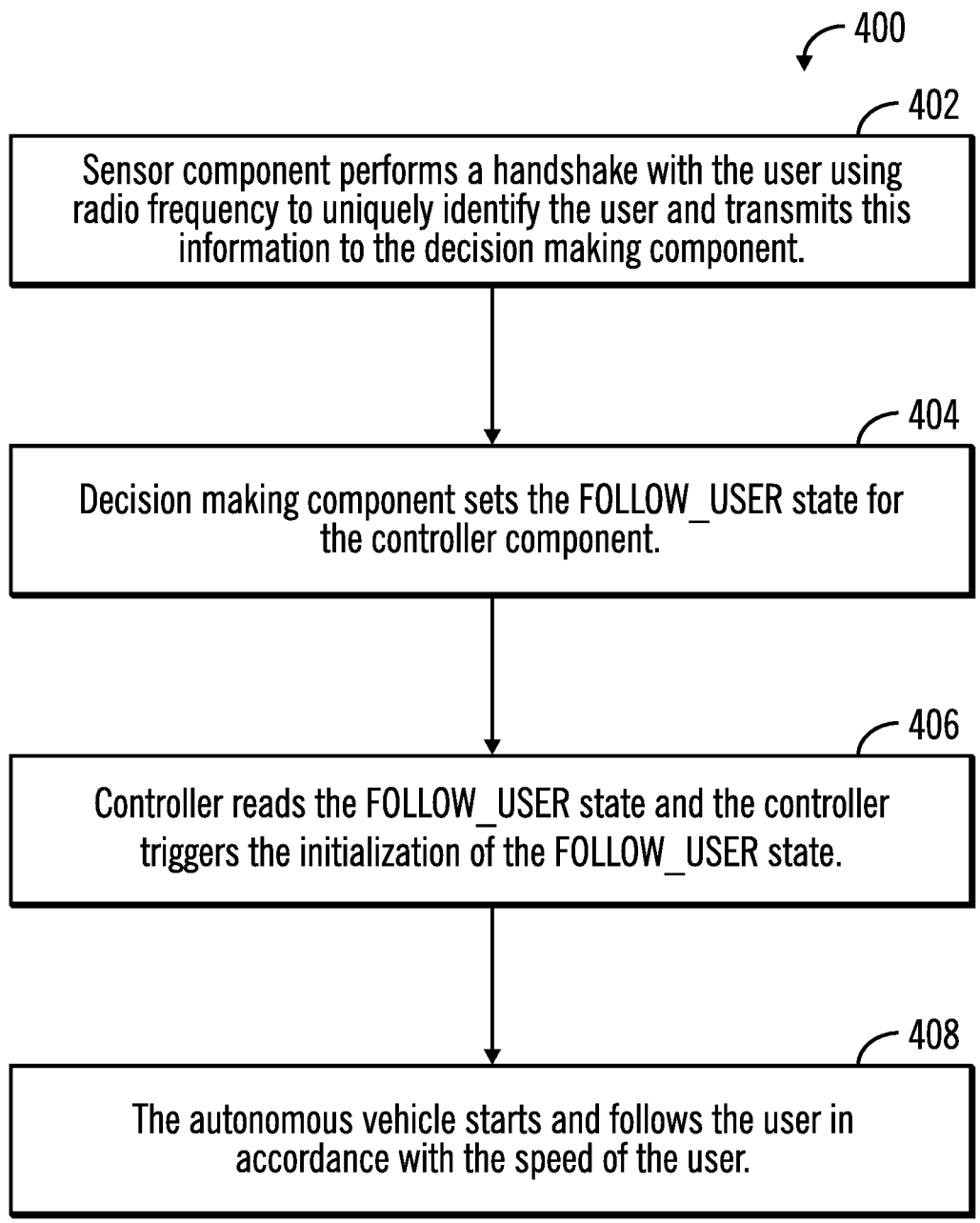
FIG. 4 illustrates a flowchart that shows operations performed by components of the autonomous vehicle, in accordance with certain embodiments.

FIG. 4 illustrates a flowchart 400 that shows operations performed by components of the autonomous vehicle 104, in accordance with certain embodiments.

Control starts at block 402 in which the sensor component 106 performs a handshake with the user (e.g., the individual 124) using radio frequency to uniquely identify the user and transmits this information to the decision making component 110. The decision making component sets (at block 404) a FOLLOW_USER state for the controller component

108. The controller 108 reads (at block 406) the FOLLOW_USER state and the controller 108 and triggers the initialization of the FOLLOW_USER state, and in response the autonomous vehicle 104 starts and follows (at block 408) the user in accordance with the speed of the user.

Figure 5:
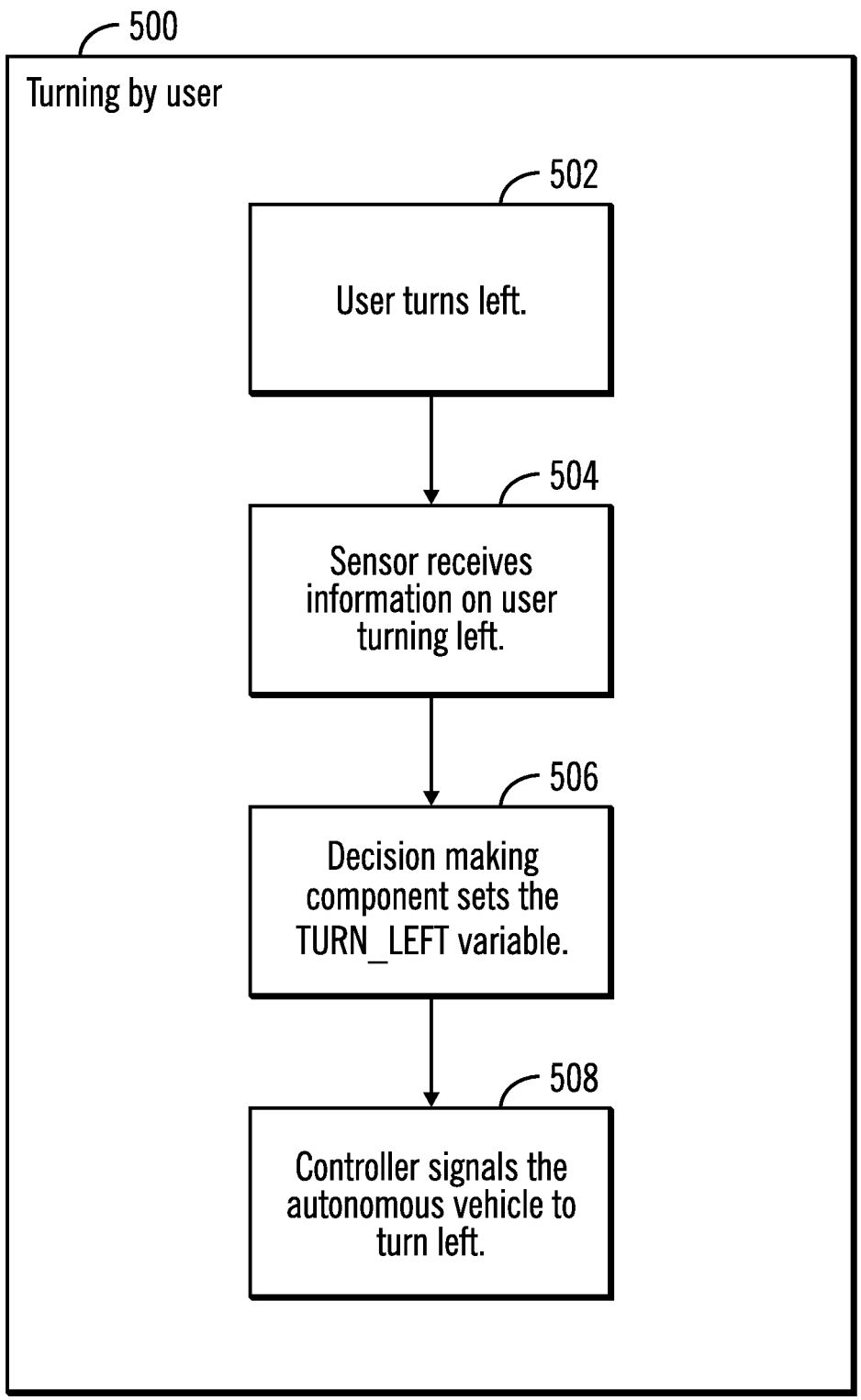
FIG. 5 illustrates a flowchart that shows operations performed in response to a user turning while moving, in accordance with certain embodiments.

FIG. 5 illustrates a flowchart 500 that shows operations performed in response to a user turning while moving, in accordance with certain embodiments.

Control starts at lock 502 in which the user 124 turns left. The sensor component 106 receive information on the user turning left (at block 504), and the decision making component 110 sets (at block 506) the TURN_LEFT 118 variable. Control proceeds to block 508 in which the controller 108 signals the autonomous vehicle 104 to turn left.

Figure 6:
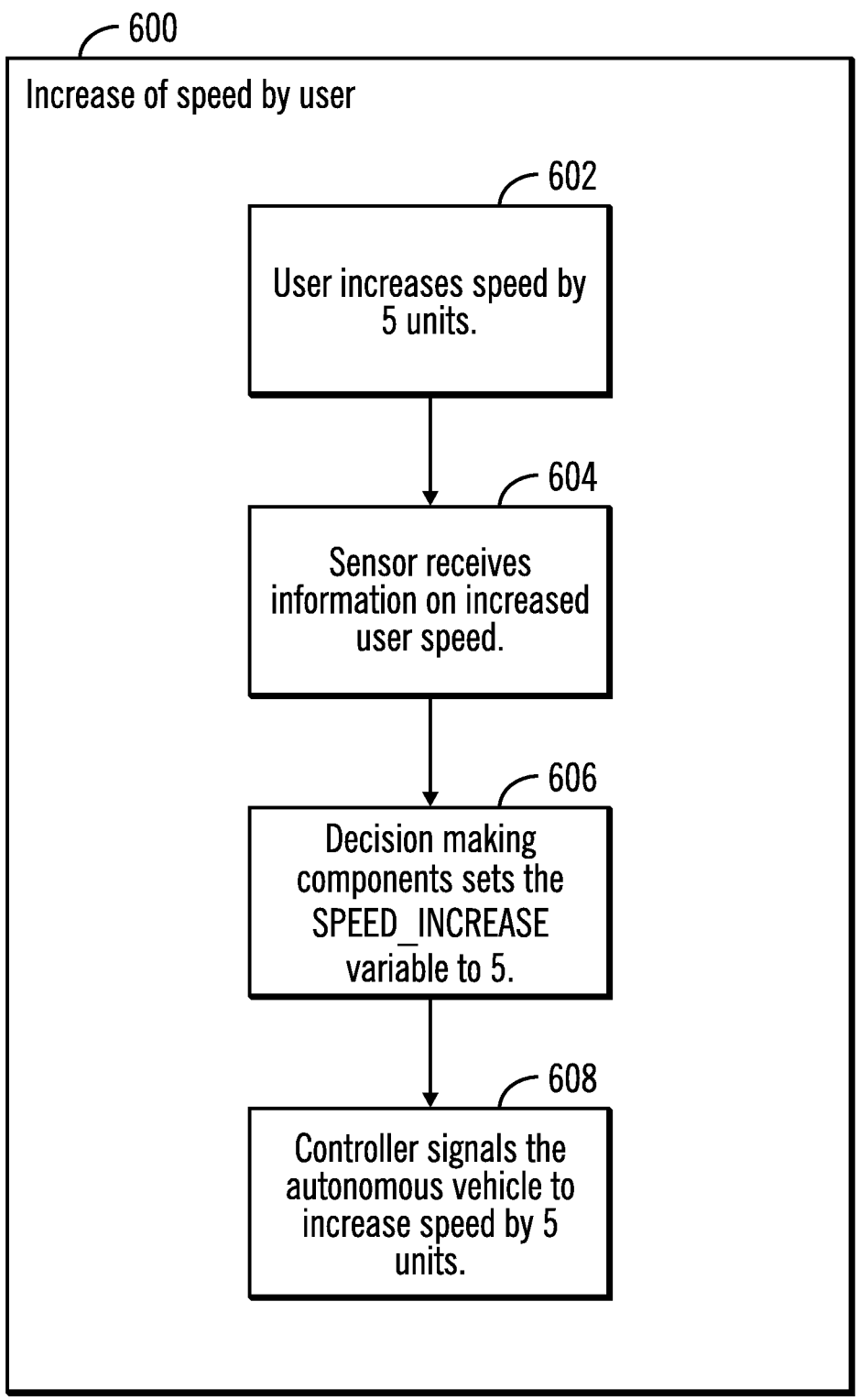
FIG. 6 illustrates a flowchart that shows operations performed in response to an increase of the speed of movement by a user, in accordance with certain embodiments.

FIG. 6 illustrates a flowchart 600 that shows operations performed in response to an increase of speed of movement by a user, in accordance with certain embodiments.

Control starts at block 602 in which the user increases his speed by 5 units. The sensor component 106 receives information on the increased user speed (at block 604). Control proceeds to block 606 in which the decision making component 110 sets a SPEED_INCREASE variable to 5. The controller 108 then signals the autonomous vehicle 104 to increase speed by 5 units.

Figure 7:
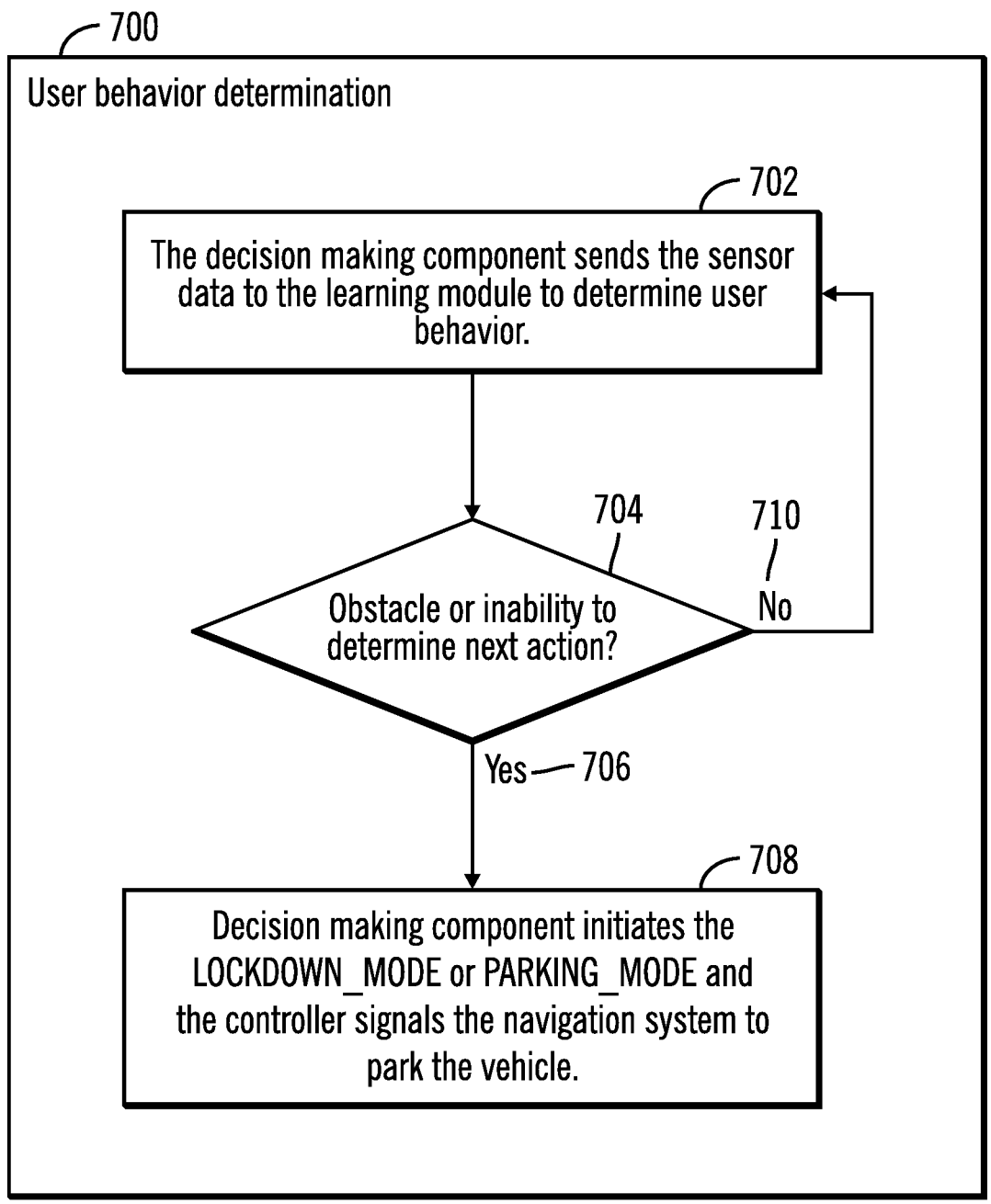
FIG. 7 illustrates a flowchart that shows operations performed in response to user behavior determination, in accordance with certain embodiments.

FIG. 7 illustrates a flowchart 700 that shows operations performed in response to user behavior determination, in accordance with certain embodiments.

Control starts at block 702 in which the decision making component 110 sends the sensor data from the sensor components 106 to the learning module 114 (the cognitive engine) to determine user behavior. A determination is made as to whether there is an obstacle or a there is an inability to determine the next action (at block 704). If so ("Yes" branch 706), then the decision making component 110 initiates a LOCKDOWN_MODE or PARKING_MODE and the controller 108 signals a navigations system of the vehicle 104 to park the vehicle 104. If not ("No" branch 710), then control returns to block 702.

Figure 8:
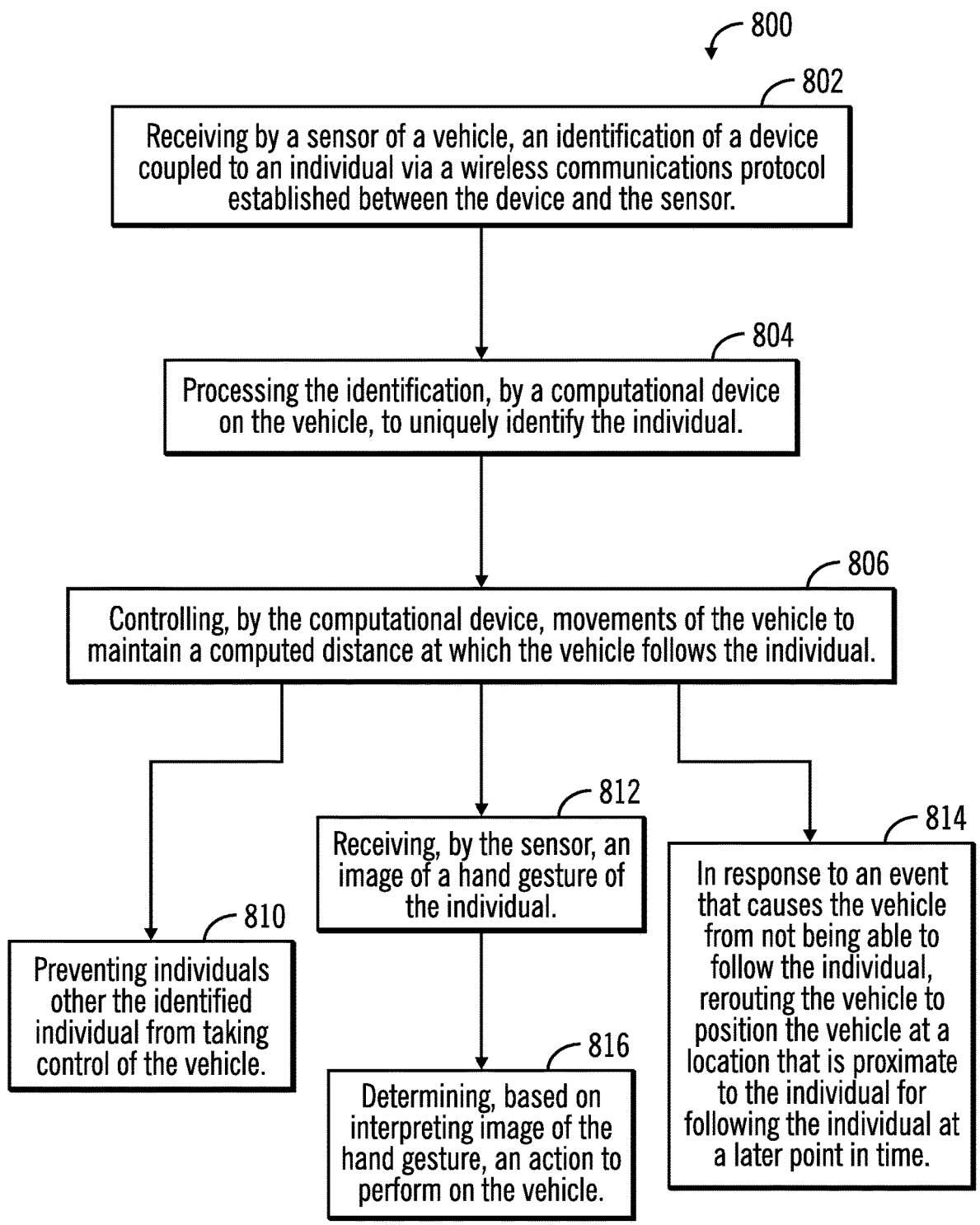
FIG. 8 illustrates a flowchart that shows operations performed for following an individual, in accordance with certain embodiments.

FIG. 8 illustrates a flowchart that shows operations performed for following an individual, in accordance with certain embodiments.

Control starts at block 802 in which a sensor 106 of a vehicle 104 receives an identification of a device 126 coupled to an individual 124, via a wireless communications protocol established between the device 126 and the sensor 106. A computational device 102 on the vehicle 104 processes (at block 804) the identification to uniquely identify the individual 124. The computational device 102 controls movements of the vehicle 104 to maintain a computed distance at which the vehicle 104 follows the individual 124 (at block 806). In certain embodiments, the wireless communication comprises radio frequency communication, wherein the computed distance is based on triangulation that determines a position of the individual and also based on a speed of movement of the individual.

From block 806 control may proceed in parallel to block 810, 812, 814. At block 810, individuals other the identified individual 124 are prevented from taking control of the vehicle 104.

At block 812, the sensor 106 receives an image of a hand gesture of the individual 124. A determination is made (at block 816) of an action to perform on the vehicle 104 based on interpreting the image of the hand gesture. In certain embodiments, the hand gesture is an indication for the vehicle to stop, where the vehicle 104 is sent a command to stop in response to the interpreting of the hand gesture.

At, block 814, in response to an event that causes the vehicle 104 from not being able to follow the individual, the computational device 102 reroutes the vehicle 104 to position the vehicle 104 at a location that is proximate (e.g., within 20 meters) to the individual for following the individual at a later point in time. For example, if the individual 124 enters and runs across a park and comes out of the other side, then using GPS sensing and cognitive prediction from the cognitive engine 114, the vehicle 104 may detect such a situation, and accordingly react by taking a road that goes around the park, and then start following the individual 124 again after reaching on the other side of the park.

Therefore, FIGS. 1-8 illustrate certain embodiments in which an autonomous vehicle 104 follows an individual over a roadway. Cognitive capabilities provided by the cognitive engine 114 are used to understand the habits and movement patterns of an individual to make better predictions about where the individual is likely to turn or stop, and the decision making component may take actions on the basis of such predictions.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 9:
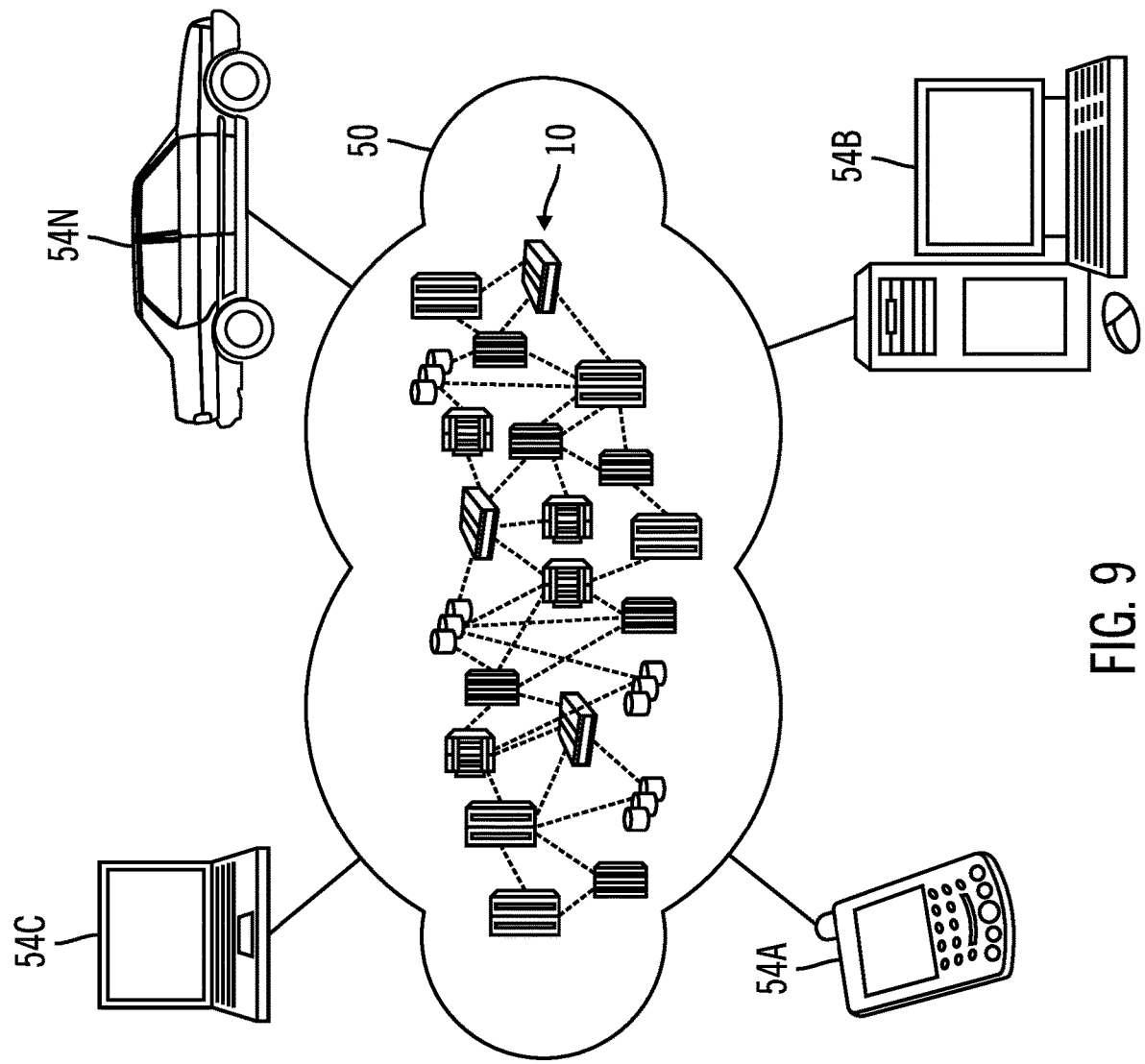
FIG. 9 illustrates a block diagram of a cloud computing environment, in accordance with certain embodiments.

Referring now to FIG. 9 an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
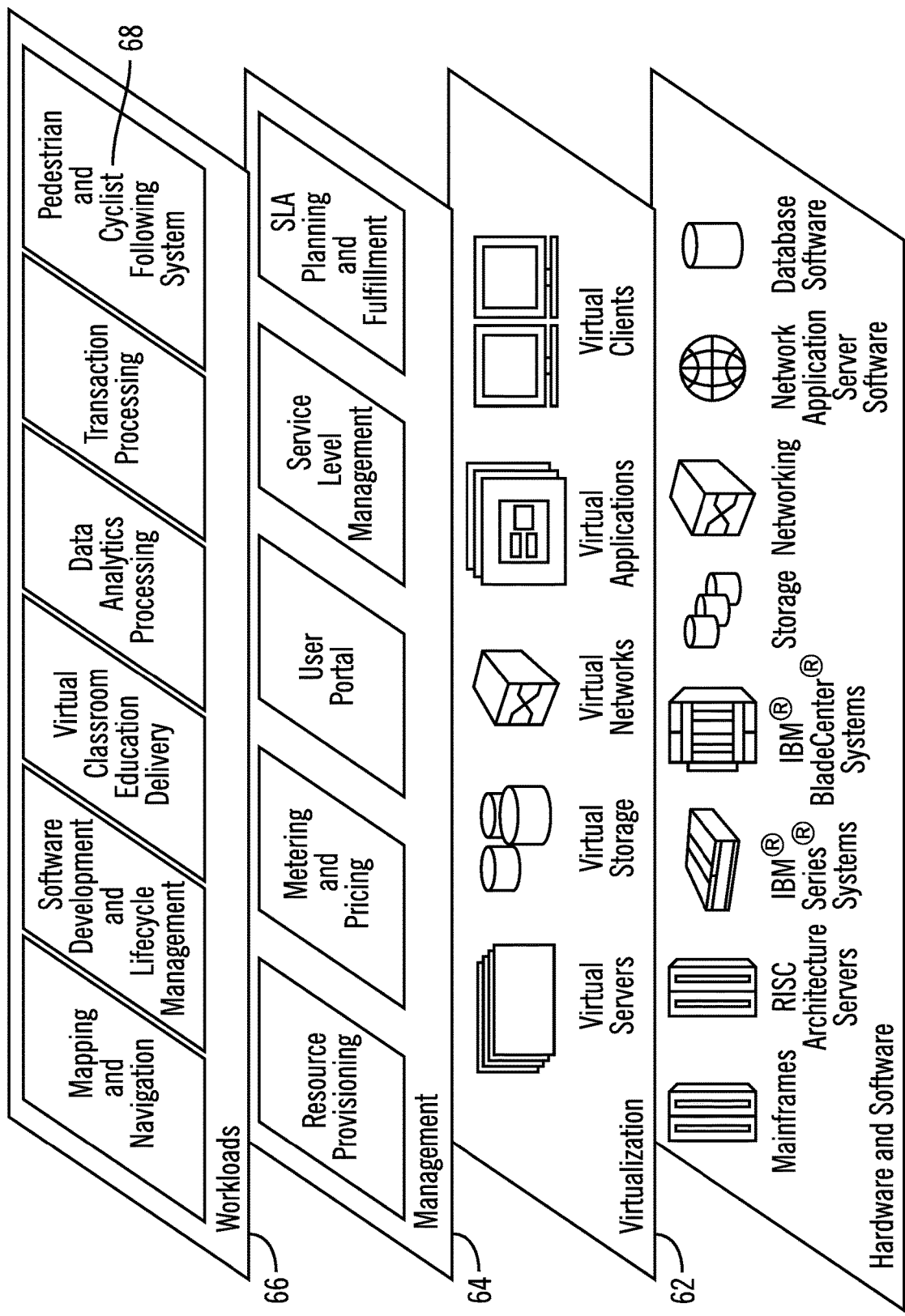
FIG. 10 illustrates a block diagram of further details of the cloud computing environment of FIG. 9, in accordance with certain embodiments.

Referring now to FIG. 10, a set of functional abstraction layers provided by cloud computing environment 50 of FIG. 9 is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and pedestrian and cycle following system 68 as shown in FIGS. 1-10.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 11:
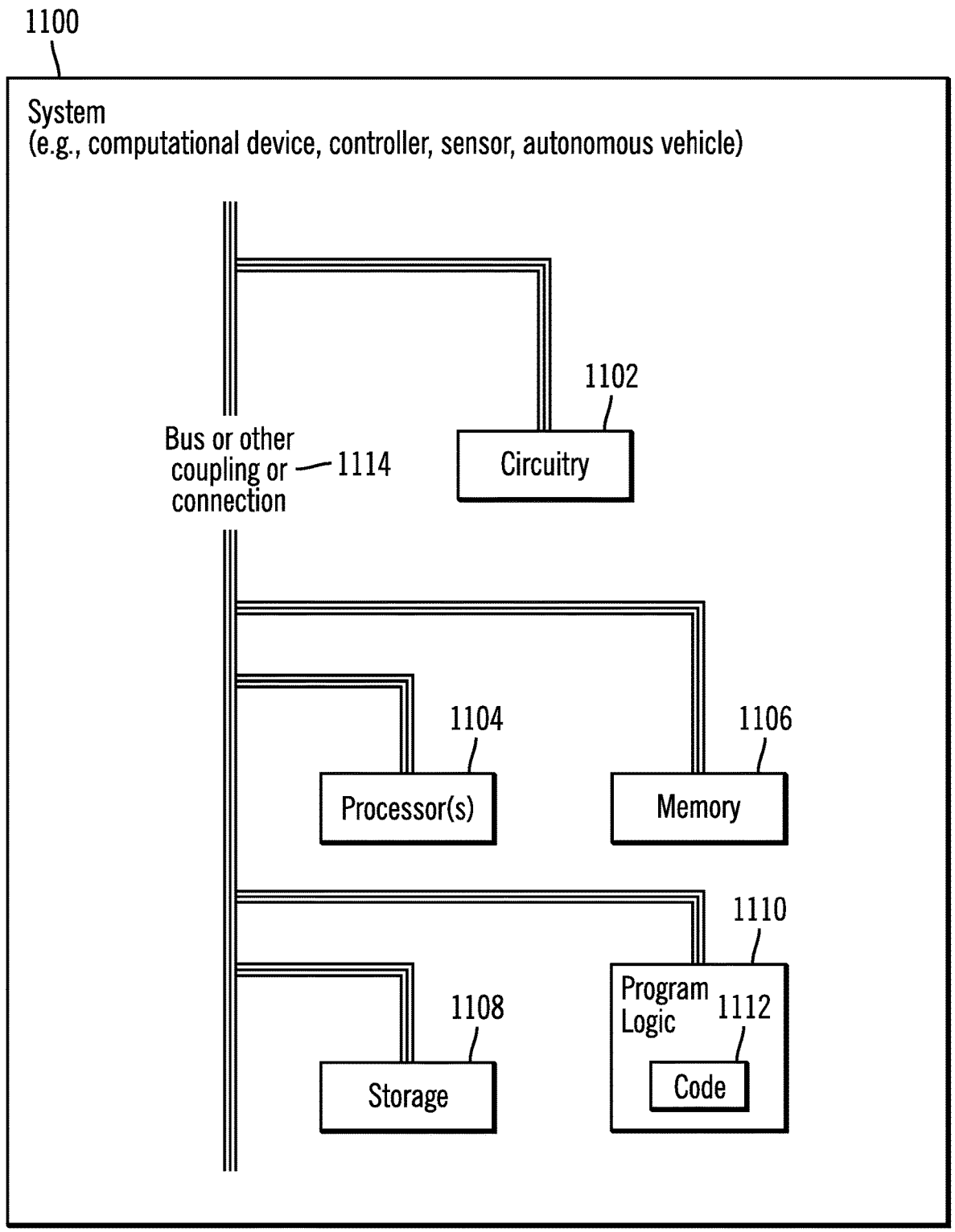
FIG. 11 illustrates a block diagram of a computational system that shows certain elements that may be included in the storage controller or the host, as described in FIGS. 1-10, in accordance with certain embodiments.

FIG. 11 illustrates a block diagram that shows certain elements that may be included in the computational device 102 deployed in the autonomous vehicle 104, in accordance with certain embodiments. The system 1100 may include a circuitry 1102 that may in certain embodiments include at least a processor 1104. The system 1100 may also include a memory 1106 (e.g., a volatile memory device), and storage 1108. The storage 1108 may include a non-volatile memory device (e.g., EEPROM, ROM, PROM, flash, firmware, programmable logic, etc.), magnetic disk drive, optical disk drive, tape drive, etc. The storage 1108 may comprise an internal storage device, an attached storage device and/or a network accessible storage device. The system 1100 may include a program logic 1110 including code 1112 that may be loaded into the memory 1106 and executed by the processor 1104 or circuitry 1102. In certain embodiments, the program logic 1110 including code 1112 may be stored in the storage 1108. In certain other embodiments, the program logic 1110 may be implemented in the circuitry 1102. One or more of the components in the system 1100 may communicate via a bus or via other coupling or connection 1114. Therefore, while FIG. 11 shows the program logic 1110 separately from the other elements, the program logic 1110 may be implemented in the memory 1106 and/or the circuitry 1102.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments.

Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   receiving, by a sensor of a vehicle, an identification of a device coupled to an individual via a wireless communications protocol established between the device and the sensor;
   processing the identification, by a computational device in the vehicle, to uniquely identify the individual;
   controlling, by the computational device, movements of the vehicle to maintain a computed distance at which the vehicle follows the individual;
   in response to predicting, by the vehicle via cooperation with a cognitive engine, a turn to be made by the individual on a road, slowing down the vehicle, and waiting to determine whether the individual turns or not, before providing turn indications and turning behind the individual; and
   preventing, by the computational device in the vehicle, anyone other than the individual from taking control of the vehicle while the individual is being followed by the vehicle, by locking one or more doors of the vehicle and triggering a horn of the vehicle to emit a loud sound to inform the individual that an effort is underway to take control of the vehicle, in response to someone coming in front of the vehicle and blocking the vehicle from following the individual.

2. The method of claim 1, wherein the wireless communication comprises radio frequency communication, and wherein the computed distance is based on triangulation that determines a position of the individual and also based on a speed of movement of the individual.

3. The method of claim 1, the method further comprising:
   receiving, by the sensor, an image of a hand gesture of the individual; and
   determining, based on interpreting the image of the hand gesture, an action to perform on the vehicle.

4. The method of claim 3, wherein the hand gesture is an indication for the vehicle to stop, and wherein the vehicle is sent a command to stop in response to the interpreting of the hand gesture.

5. The method of claim 1, wherein the computational device uses a learning module to predict anticipated turns of the individual.

6. The method of claim 1, the method further comprising:
   in response to determining that there is an obstacle that does not allow following of the individual, stopping the vehicle and communicating to the individual that the vehicle has been stopped.

7. The method of claim 1, the method further comprising:
   in response to an event that causes the vehicle from not being able to follow the individual, rerouting the vehicle to position the vehicle at a location that is proximate to the individual for following the individual at a later point in time.

8. The method of claim 1, wherein inputs from sensors in the vehicle are used to determine a radius of curvature between the individual and the vehicle to determine a turning radius of the individual.

9. A system comprising a computational device deployed in a vehicle, the system comprising:
   a memory; and
   a processor coupled to the memory, wherein the processor performs operations, the operations comprising:
      receiving, by a sensor of a vehicle, an identification of a device coupled to an individual via a wireless communications protocol established between the device and the sensor;
      processing the identification, by the computational device, to uniquely identify the individual;
      controlling, by the computational device, movements of the vehicle to maintain a computed distance at which the vehicle follows the individual;
      in response to predicting, by the vehicle via cooperation with a cognitive engine, a turn to be made by the individual on a road, slowing down the vehicle, and waiting to determine whether the individual turns or not, before providing turn indications and turning behind the individual; and
      preventing, by the computational device in the vehicle, anyone other than the individual from taking control of the vehicle while the individual is being followed by the vehicle, by locking one or more doors of the vehicle and triggering a horn of the vehicle to emit a loud sound to inform the individual that an effort is underway to take control of the vehicle, in response to someone coming in front of the vehicle and blocking the vehicle from following the individual.

10. The system of claim 9, wherein the wireless communication comprises radio frequency communication, and wherein the computed distance is based on triangulation that determines a position of the individual and also based on a speed of movement of the individual.

11. The system of claim 9, the operations further comprising:
    receiving, by the sensor, an image of a hand gesture of the individual; and
    determining, based on interpreting the image of the hand gesture, an action to perform on the vehicle.

12. The system of claim 11, wherein the hand gesture is an indication for the vehicle to stop, and wherein the vehicle is sent a command to stop in response to the interpreting of the hand gesture.

13. The system of claim 9, wherein the computational device uses a learning module to predict anticipated turns of the individual.

14. The system of claim 9, the operations further comprising:
    in response to determining that there is an obstacle that does not allow following of the individual, stopping the vehicle and communicating to the individual that the vehicle has been stopped.

15. The system of claim 9, the operations further comprising:
    in response to an event that causes the vehicle from not being able to follow the individual, rerouting the vehicle to position the vehicle at a location that is proximate to the individual for following the individual at a later point in time.

16. The system of claim 9, wherein inputs from sensors in the vehicle are used to determine a radius of curvature between the individual and the vehicle to determine a turning radius of the individual.

17. A computer program product, the computer program product comprising a non-transitory computer readable storage medium having computer readable program code embodied therewith, the computer readable program code configured to perform operations, the operations comprising:
- receiving, by a sensor of a vehicle, an identification of a device coupled to an individual via a wireless communications protocol established between the device and the sensor;
- processing the identification, by a computational device on the vehicle, to uniquely identify the individual;
- controlling, by the computational device, movements of the vehicle to maintain a computed distance at which the vehicle follows the individual;
- in response to predicting, by the vehicle via cooperation with a cognitive engine, a turn to be made by the individual on a road, slowing down the vehicle, and waiting to determine whether the individual turns or not, before providing turn indications and turning behind the individual; and
- preventing, by the computational device in the vehicle, anyone other than the individual from taking control of the vehicle while the individual is being followed by the vehicle, by locking one or more doors of the vehicle and triggering a horn of the vehicle to emit a loud sound to inform the individual that an effort is underway to take control of the vehicle, in response to someone coming in front of the vehicle and blocking the vehicle from following the individual.

18. The computer program product of claim 17, wherein the wireless communication comprises radio frequency communication, and wherein the computed distance is based on triangulation that determines a position of the individual and also based on a speed of movement of the individual.

19. The computer program product of claim 17, the operations further comprising:
- receiving, by the sensor, an image of a hand gesture of the individual; and
- determining, based on interpreting the image of the hand gesture, an action to perform on the vehicle.

20. The computer program product of claim 17, wherein inputs from sensors in the vehicle are used to determine a radius of curvature between the individual and the vehicle to determine a turning radius of the individual.

* * * * *